United States Patent
Bakin et al.

(10) Patent No.: US 9,160,581 B2
(45) Date of Patent: Oct. 13, 2015

(54) RECEIVER WITH DOPPLER TOLERANT EQUALIZATION

(75) Inventors: Evgeny Bakin, Saint-Petersburg (RU); Grigory Evseev, Saint-Petersburg (RU); Evgeny Pustovalov, Saint-Petersburg (RU); Andrey Turlikov, Saint-Petersburg (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,290

(22) PCT Filed: May 15, 2012

(86) PCT No.: PCT/RU2012/000382
§ 371 (c)(1),
(2), (4) Date: Mar. 26, 2014

(87) PCT Pub. No.: WO2013/172729
PCT Pub. Date: Nov. 21, 2013

(65) Prior Publication Data
US 2014/0211837 A1  Jul. 31, 2014

(51) Int. Cl.
*H04L 27/06* (2006.01)
*H04L 25/03* (2006.01)
(Continued)

(52) U.S. Cl.
CPC ........ *H04L 25/03885* (2013.01); *H04L 25/023* (2013.01); *H04L 25/0212* (2013.01); *H04L 25/0256* (2013.01); *H04L 25/03133* (2013.01); *H04B 2001/70724* (2013.01)

(58) Field of Classification Search
CPC ........................................... H04B 2001/70724
See application file for complete search history.

(56) References Cited

U.S. PATENT DOCUMENTS

| 6,064,655 A | 5/2000 | Murphy |
| 6,700,919 B1 | 3/2004 | Papasakellariou |
| 8,423,862 B2 | 4/2013 | Yokomakura et al. |

(Continued)

FOREIGN PATENT DOCUMENTS

| EP | 1584168 B1 | 1/2007 |
| JP | 2003-152603 A | 5/2003 |

(Continued)

OTHER PUBLICATIONS

Bermudez, "Adaptive Filtering—Theory and Applications", IRIT-INP-ENSEEIHT—Toulouse, May 2011.

(Continued)

*Primary Examiner* — Santiago Garcia
(74) *Attorney, Agent, or Firm* — Grossman, Tucker, Perreault & Pfleger, PLLC (57) ABSTRACT

A mobile communication device to equalize a Doppler shifted received signal according to one embodiment is configured to: extract one or more pilot signals from a segment of the received signal; perform Minimum Mean Square Error (MMSE) filtering on the extracted pilot signals, wherein the filter provides estimated pilot signal impulse responses; estimate the amplitudes of one or more path components of the estimated pilot signal impulse responses; estimate the phases of one or more path components of the estimated pilot signal impulse responses; and combine the estimated amplitudes and the estimated phases of the path components of the pilot signal impulse responses, wherein the combination provides an estimated channel impulse response.

26 Claims, 8 Drawing Sheets (51) Int. Cl.
*H04L 25/02* (2006.01)
*H04B 1/707* (2011.01)

(56) References Cited

U.S. PATENT DOCUMENTS

| | | | |
|---|---|---|---|
| 2003/0058951 | A1 | 3/2003 | Thomson et al. |
| 2004/0125863 | A1 | 7/2004 | Ghosh |
| 2005/0271016 | A1 | 12/2005 | Kim et al. |
| 2007/0183517 | A1 | 8/2007 | Liu et al. |
| 2009/0175367 | A1* | 7/2009 | Kishigami et al. ............ 375/260 |
| 2009/0245338 | A1 | 10/2009 | Jonsson |
| 2009/0285274 | A1 | 11/2009 | Shiue et al. |
| 2011/0004803 | A1 | 1/2011 | Yokomakura et al. |
| 2011/0069742 | A1 | 3/2011 | Narayan et al. |
| 2011/0201269 | A1 | 8/2011 | Hobbs et al. |
| 2011/0305286 | A1* | 12/2011 | Shimezawa et al. .......... 375/260 |
| 2012/0099637 | A1 | 4/2012 | Hu |
| 2012/0106611 | A1* | 5/2012 | Kim et al. ..................... 375/226 |
| 2012/0106614 | A1* | 5/2012 | Kim et al. ..................... 375/227 |
| 2014/0086299 | A1 | 3/2014 | Pustovalov et al. |

FOREIGN PATENT DOCUMENTS

| | | |
|---|---|---|
| JP | 2006-352218 A | 12/2006 |
| JP | 2010-087707 A | 4/2010 |
| WO | 2012/134319 A1 | 10/2012 |

OTHER PUBLICATIONS

International Search Report and Written Opinion received for PCT Application No. PCT/RU2012/000382, mailed on Feb. 14, 2013, 8 Pages.

International Search Report and Written Opinion received for PCT Application No. PCT/RU2011/000201, mailed on Jun. 13, 2012, 16 Pages.

Invitation to Pay Add'l Fees and Partial Search Report received for PCT Application No. PCT/RU2011/000201, mailed on Jan. 17, 2012, 5 Pages.

Office Action received for Japanese Patent Application No. 2012-010985, mailed on Jun. 18, 2013, 4 Pages of Office Action including 2 pages of English Translation.

Wu et al., "Low Complexity Adaptive Turbo Frequency-Domain Channel Estimation for Single-Carrier Multi-User Detection", IEEE Transactions on Wireless Communications, IEEE Service Center, vol. 7, Issue 11, Nov. 1, 2008, Piscataway, NJ, US, pp. 4094-4099.

Pancaldi et al.,"Single-Carrier Frequency Domain Equalization", IEEE Signal Processing Magazine, IEEE Service Center, vol. 25, Issue 5, Sep. 1, 2008, Piscataway, NJ, US, pp. 37-56.

Benvenuto et al., "Single Carrier Modulation With Nonlinear Frequency Domain Equalization: An Idea Whose Time Has Come Again", Proceedings of the IEEE, vol. 98, Issue 1, Jan. 1, 2010, New York, US, pp. 69-96.

International Search Report received for PCT Application No. PCT/RU2012/000236, mailed on Jul. 25, 2013.

Related US application PCT Application No. PCT/RU2012/000236 filed Mar. 30, 2013.

ATSC Digital Television Standard Part 2—RF Transmission System Characteristics 2007.

ATSC Recommended Practice: Receiver Performance Guidelines, Document A/ 74:2010, Apr. 7, 2010.

Rapoport BI, Kedzierski JT, Sarpeshkar R (2012) A Glucose Fuel Cell for Implantable Brain—Machine Interfaces. PLoS ONE 7(6): e38436. doi:10.1371/journal.pone.0038436, May 2011.

Office Action received for Korean Patent Application No. 10-2013-7025262, mailed on Oct. 29, 2014, 4 pages of English Translation and 9 pages of Korean Office Action.

Office Action received for Chinese Patent Application No. 201210103912.2, mailed on Jun. 4, 2014, 12 pages of English Translation and 8 pages of Chinese Office Action.

Office Action received for Chinese Patent Application No. 201210103912.2, mailed on Jan. 28, 2015, 4 pages of English translation and 3 pages of Chinese Office Action.

Liu, et al., "Frequency Domain Turbo Equalization for Vestigial Sideband Modulation with Punctured Trellis Coding", Signal Processing Advances in Wireless Communications, Jul. 2006, 5 pages.

Kim, Hyoung-Nam, et al., "Near-Optimum Blind Decision Feedback Equalization for ATSC Digital Television Receivers", ETRI Journal, vol. 26, No. 2, Apr. 2004, 11 pages.

MacKenzie, Abert, Set, "General Description of Laboratory Tests—Multipath interference", DTV Field Test Report in Brazil, Jul. 2000, 279 pages.

International Preliminary Report on Patentability and Written Opinion Received for PCT Patent Application No. PCT/RU2011/000201, mailed on Oct. 10, 2013, 11 pages.

International Preliminary Report on Patentability and Written Opinion Received for PCT Patent Application No. PCT/RU2012/000382, mailed on Nov. 27, 2014, 6 pages.

Pham, et al., "Enhanced ATSC DTV Channel Estimation", IEEE Conference on Electrical and Computer Engineering, Canada, May 3-6, 2009, 5 pages.

Wenyi, Dai, "Turbo Equalization of Wireless Communication Systems", China Mater's Theses Full-text Database, Information Technology Section (Monthly), 2009, No. 12, 3 pages.

* cited by examiner

RECEIVER WITH DOPPLER TOLERANT EQUALIZATION

FIELD

The present disclosure relates to receivers, and more particularly, to receivers with adaptive Doppler tolerant equalization using linear prediction.

BACKGROUND

Signals propagating from a transmitter to a receiver over a channel may be subject to multipath effects where reflections, such as those off structures for example, cause attenuated and delayed versions of the signal to arrive at the receiver in addition to, or sometimes in place of a directly arriving signal. Furthermore, in a dynamic environment, where the transmitter and/or the receiver are in motion for example, the received signal as well as its multipath components may be subjected to independent Doppler shifts.

Channel equalization methods are typically performed at the receiver to compensate for the multipath effects. These equalizers, which generally use block-based frequency domain processing to improve efficiency, are subject to performance degradation, however, resulting from the Doppler shifts in dynamic multipath channels.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for receiver channel equalization employing adaptive Doppler tolerant linear prediction based equalization. This may be accomplished with a time domain Minimum Mean Squared Error (MMSE) channel impulse response estimation circuit that operates on pilot signals extracted from the received signal. Amplitudes and phases for each of the multipath components of the channel impulse response are estimated for each of the pilot signals and then combined to form an estimated channel impulse response. The estimated channel impulse response may then be converted to the frequency domain for use in a channel equalizer.

Figure 1:
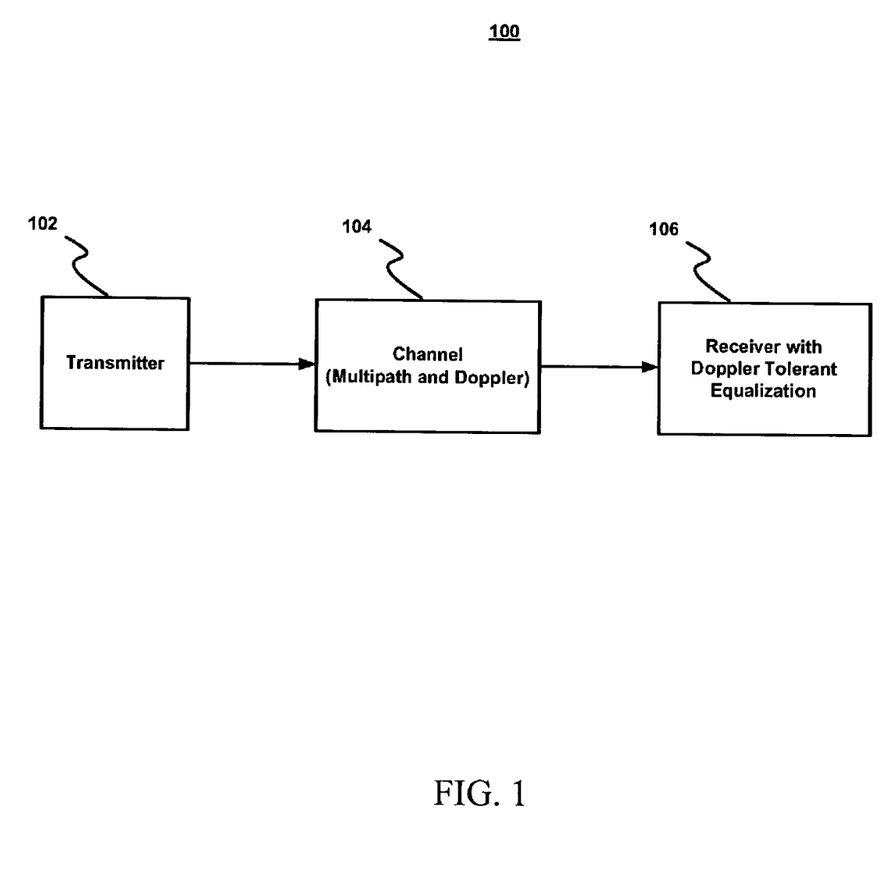
FIG. 1 illustrates a top level system diagram of one exemplary embodiment consistent with the present disclosure.

FIG. 1 illustrates a top-level system diagram 100 of one exemplary embodiment consistent with the present disclosure. Transmitter 102 transmits a signal, which propagates over a channel (or transmission medium) 104 that introduces multipath and Doppler shift, and is then received by receiver 106. The multipath may be caused, for example, by reflection off structures in the environment. The Doppler shift may be generated by relative motion between the transmitter and receiver, either of which may be in motion, such as for example with mobile communication devices. Receiver 106 may employ digital signal processing (DSP) techniques to improve performance, such as, for example, an MMSE channel equalizer that is Doppler tolerant. In some embodiments, transmitter 102 may transmit an Advanced Television System Committee (ATSC) digital television signal, a wireless communication signal or any other signal that comprises pilot signals.

If the channel comprises p paths with delays $\tau_1, \tau_2, \ldots \tau_p$, amplitudes $A_1, A_2, \ldots A_p$, initial phases $\phi_1, \phi_2, \ldots \phi_p$, and Doppler shifts $f_1^{dop}, f_2^{dop}, \ldots f_p^{dop}$, with initial Doppler shift phases $\phi_1^{dop}, \phi_2^{dop}, \ldots \phi_p^{dop}$, then instantaneous impulse response of the channel at the moment to can be described as:

$$h_{inst}^{t_0}(t) = \sum_{k=1}^{p} A_k \delta(t-\tau_k) e^{j\varphi_k} e^{j\left(2\pi f_k^{dop} t_0 + \varphi_k^{dop}\right)} =$$

$$\sum_{k=1}^{p} A_k \delta(t-\tau_k) e^{j\varphi_k^0} e^{j2\pi f_k^{dop} t_0} = \sum_{k=1}^{p} A_k \delta(t-\tau_k) e^{j\Psi_k(t_0)}$$

and the instantaneous frequency response, $H^{t_0}_{inst}$ is the Fourier transform of the instantaneous impulse response.

Figure 2:
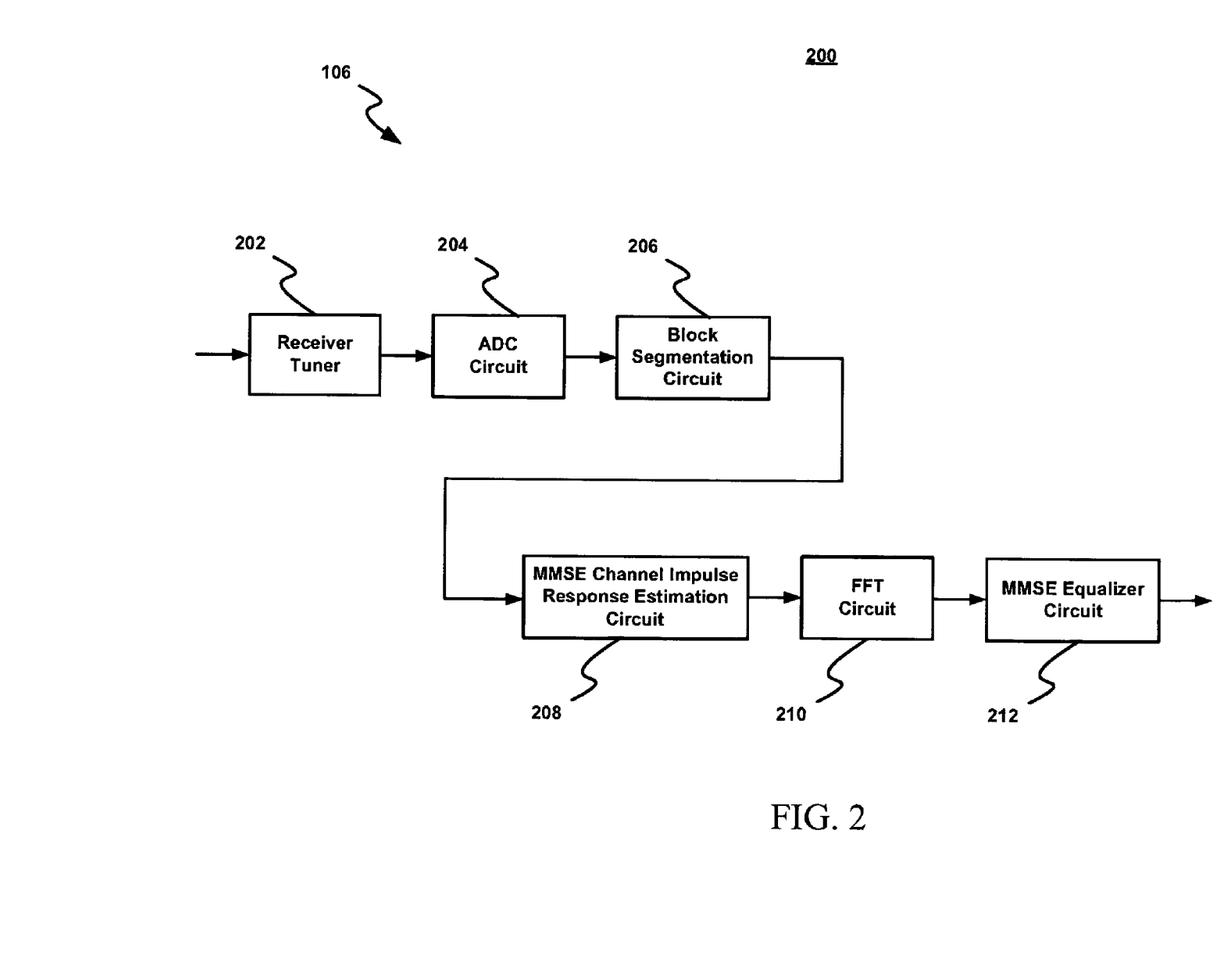
FIG. 2 illustrates a system block diagram of one exemplary embodiment consistent with the present disclosure.

FIG. 2 illustrates a system block diagram 200 of one exemplary embodiment consistent with the present disclosure. Receiver 106 is shown to include a tuner 202 which is configured to tune to the frequency of the signal to be received. Additional receiver front-end circuitry (not shown) may be employed to downshift, filter and pre-process the signal as needed. An analog to digital converter (ADC) circuit 204 converts the pre-processed signal to digital samples which may then be segmented into blocks by block segmentation circuit 206. In some embodiments, the blocks may overlap in time by a pre-determined amount. The MMSE channel impulse response estimation circuit 208 estimates the channel impulse response using linear prediction techniques and employing the pilot signals included in the received signal as will be described in greater detail below. The estimated channel impulse response for the given block is then converted to the frequency domain by FFT circuit 210 and used by MMSE equalizer circuit 212.

Figure 3:
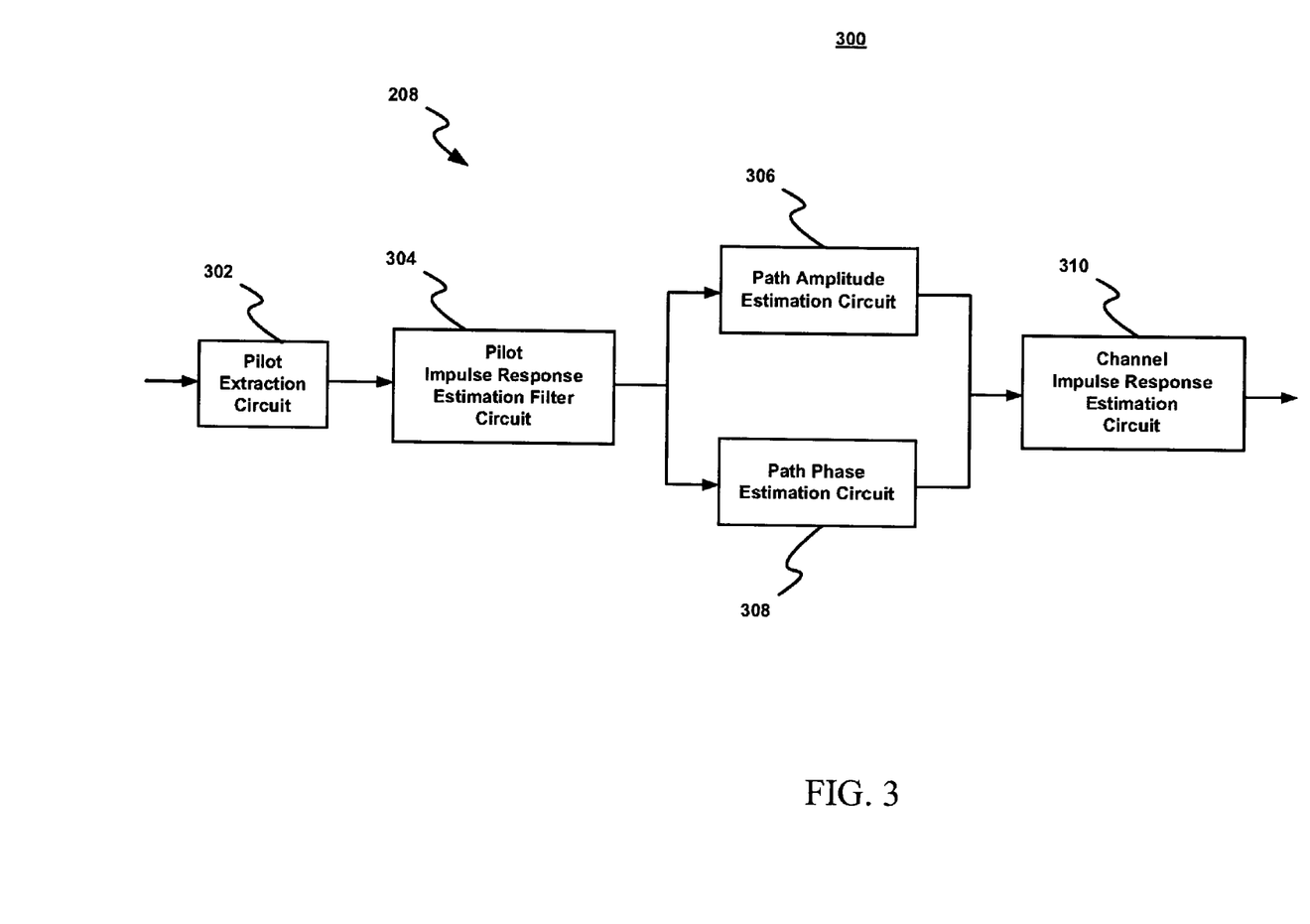
FIG. 3 illustrates a more detailed block diagram of one exemplary embodiment consistent with the present disclosure.

FIG. 3 illustrates a block diagram 300 of one exemplary embodiment consistent with the present disclosure showing a more detailed view of MMSE channel impulse response estimation circuit 208. Pilot extraction circuit 302 extracts one or more of the pilot signals that are included in the received signal. For each pilot signal, pilot impulse response estimation filter circuit 304 uses an MMSE linear predictive filter to estimate the impulse response associated with that pilot signal. The filter circuit 304 may operate as follows. The extracted pilot signal, designated as a vector of samples y, may be modeled by the equation:

$y=Xh+n$ where X is a matrix containing the known symbols comprising that pilot signal, of which there are $N_{p1}$:

$$X = \begin{pmatrix} x_1 & x_2 & \cdots & x_L \\ x_2 & x_3 & \cdots & x_{L+1} \\ \vdots & \vdots & \ddots & \vdots \\ x_{Npl-L} & x_{(Npl-L)+1} & \cdots & x_{Npl-1} \\ x_{(Npl-L)+1} & x_{(Npl-L)+2} & \cdots & x_{Npl} \end{pmatrix}$$

and h is a vector containing the samples of impulse response (of length L) of the channel, and n is a vector of additive white Gaussian noise (AWGN). In this case, the MMSE estimated impulse response of the channel, $\hat{h}_m$, for pilot signal m can be calculated as:

$$\hat{h}_m = (X_m^H X_m)^{-1} X_m^H y_m$$

where the superscript H designates the complex conjugate transpose operation of the matrix, also known as the Hermitian operation.

Path amplitude estimation circuit 306 estimates the impulse response amplitudes of the paths according to:

$$\hat{A}_m = |\hat{h}_m|$$

$$\hat{A} = \frac{1}{R} \sum_{m=1}^{R} \hat{A}_m$$

which is an average of the magnitudes of the estimated channel impulse responses over R pilot signals for each of the L paths.

Path phase estimation circuit 308 estimates the impulse response phases of the paths based on the fact that the full phase of every path is a linear function of time. Thus, if $\hat{\Psi}_m = \arg(\hat{h}_m)$, then $\underline{\hat{\Psi}_m(k)} = \hat{\phi}_k^0 + 2\pi T_{pl} \cdot m \cdot \hat{f}_k^{dop}$, where $T_{pl}$ is the period of pilot signal insertion in the transmitted signal, and a least squares straight line curve fit can be applied to the R estimates to obtain a slope and intercept corresponding to $\hat{f}_k^{dop}$, and $\hat{\phi}_k^0$ respectively for each of the k paths.

Channel impulse response estimation circuit 310 may then calculate the estimated channel impulse response based on the estimates $\hat{A}_k$, $\hat{f}_k^{dop}$, and $\hat{\phi}_k^0$ according to the equation for $h_{inst}$ given above. The estimates of $\hat{A}_k$, $\hat{f}_k^{dop}$, and $\hat{\phi}_k^0$ may be updated every $T_{pl}$ time period. Thus, the estimation is calculated over a sliding window with duration $RT_{pl}$. One example of the use of a sliding window is illustrated in greater detail in FIG. 8 which shows a sequence of pilot signals and data signal. An estimation 804 is calculated based on a windowed segment 802 of pilot and data signals. The estimation 804 is used for equalization of the data block 810 that follows the windowed segment 802. The sliding window may then move forward to window a new segment 806 that includes the next pilot signal while dropping the oldest pilot signal. A new estimation 808 is then calculated based on the new windowed segment 806 of pilot and data signals. This new estimation 808 is used for equalization of the data block 812 that follows the windowed segment 806. This process may continue indefinitely with the window sliding forward to include each new pilot signal.

In some embodiments, a minimum of value or R may be 2 for a dynamic channel and 1 for a static channel.

Figure 4:
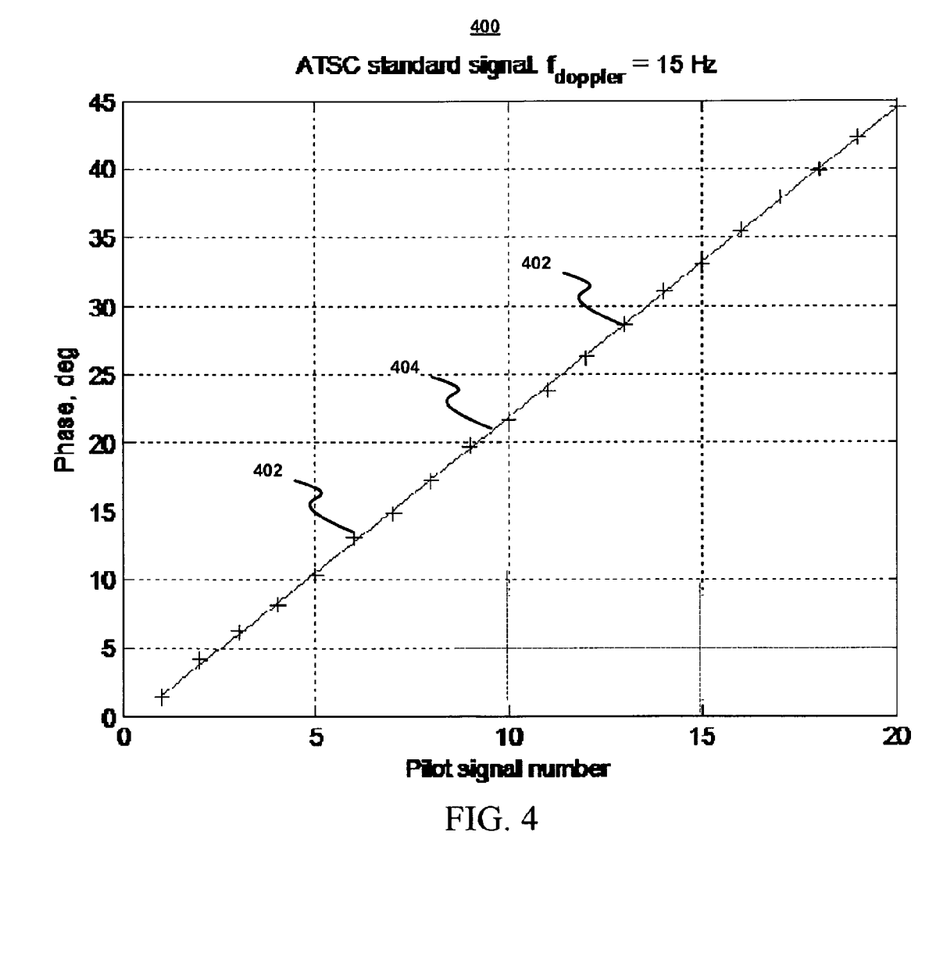
FIG. 4 illustrates a phase slope plot consistent with one exemplary embodiment of the present disclosure.

FIG. 4 illustrates a phase slope plot 400 consistent with one exemplary embodiment of the present disclosure. The phase, in degrees, is shown on the y-axis versus pilot signal number on the x-axis. Samples of $\hat{\Psi}_m$ 402 are shown along with a least squares straight line fit 404.

Figure 5:
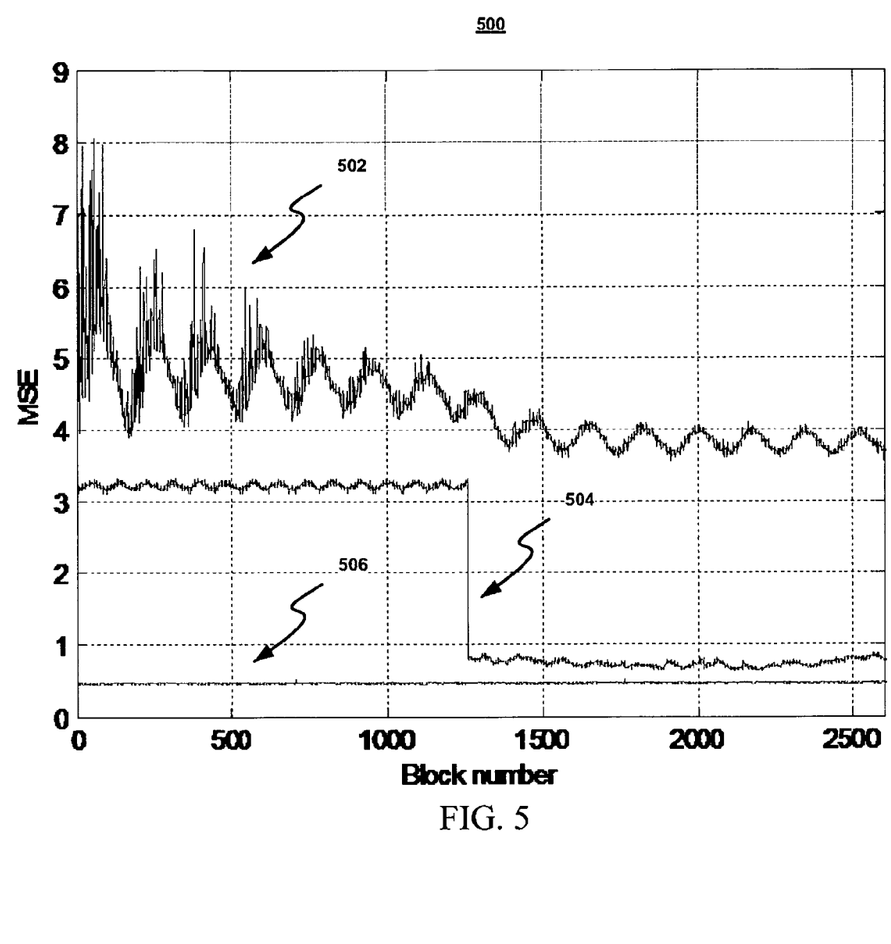
FIG. 5 illustrates performance curves consistent with one exemplary embodiment of the present disclosure.

FIG. 5 illustrates performance curves 500 consistent with one exemplary embodiment of the present disclosure. The curves were generated for a case with a single dynamic echo channel with a path delay of 5 microseconds, attenuation of −3 dB and a signal to noise ratio of 25 dB. The Mean Squared Error (MSE) at the equalizer output is shown on the y-axis versus the block number on the x-axis. Curve 502 represents the performance of a prior-art equalizer. Curve 504 represents the performance of an exemplary embodiment of an equalizer consistent with the present disclosure. Curve 506 represents the performance of an equalizer when the dynamic channel profile is known, i.e., a theoretical optimal performance limit.

Figure 6:
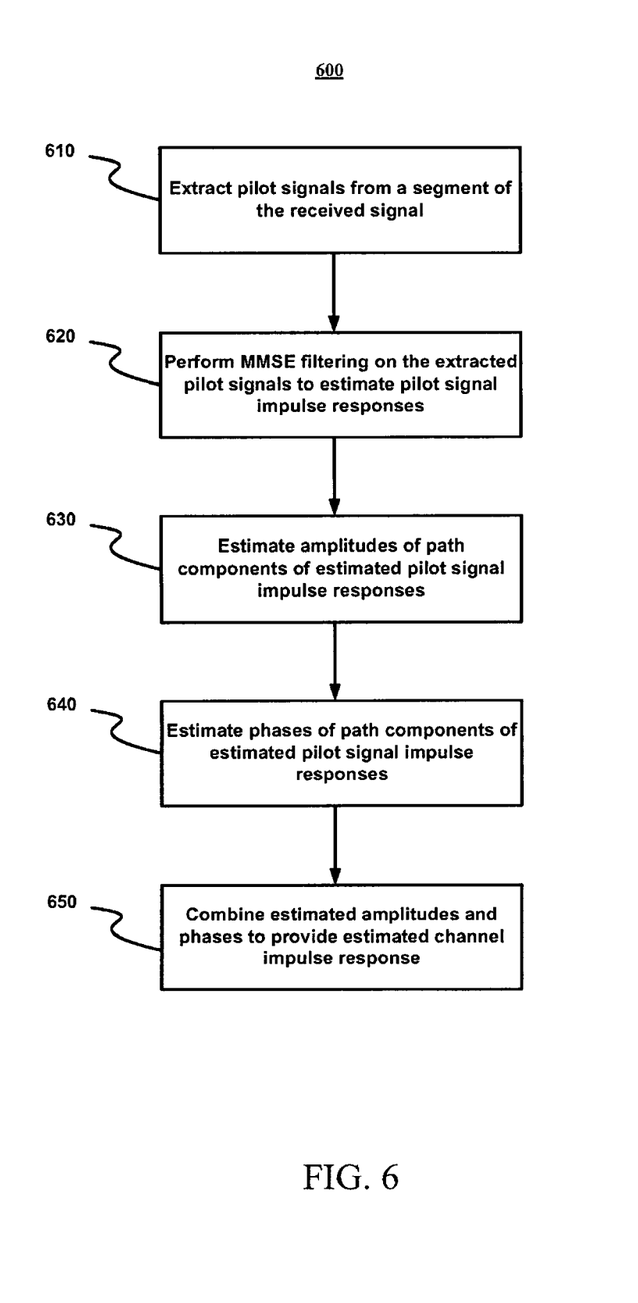
FIG. 6 illustrates a flowchart of operations of an exemplary embodiment consistent with the present disclosure.

FIG. 6 illustrates a flowchart of operations 600 of an exemplary embodiment consistent with the present disclosure. At operation 610, pilot signals are extracted from a segment of the received signal. At operation 620, MMSE filtering is performed on the extracted pilot signals to estimate the pilot signal impulse responses. At operation 630, estimation is made of the amplitudes of the path components of the estimated pilot signals impulse responses. At operation 640, estimation is made of the phases of the path components of the estimated pilot signals impulse responses. At operation 650, the estimated amplitudes and phases are combined to provide an estimated channel impulse response. In some embodiments, the estimated channel impulse response may be transformed into the frequency domain and employed for channel equalization.

Figure 7:
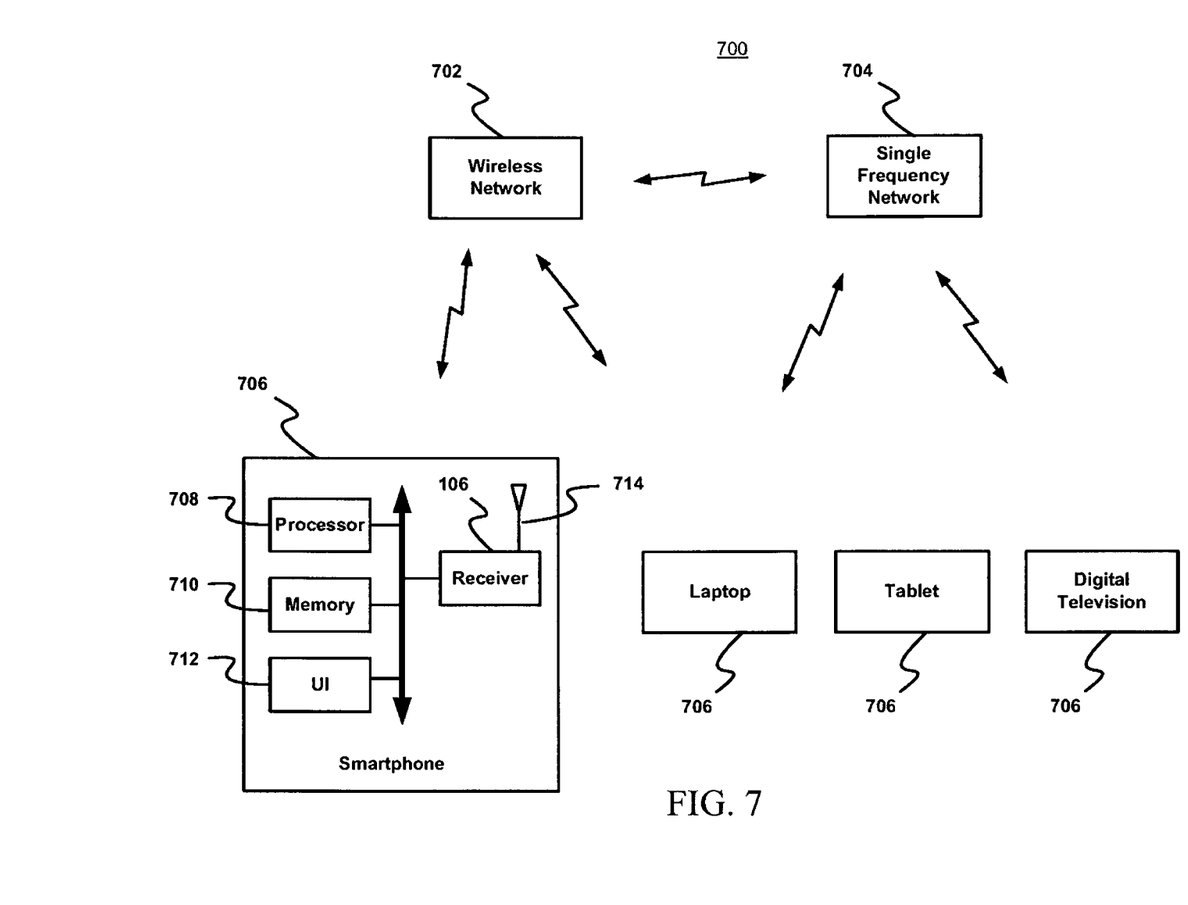
FIG. 7 illustrates a system diagram of another exemplary embodiment consistent with the present disclosure.

FIG. 7 illustrates a system diagram 700 of another exemplary embodiment consistent with the present disclosure. A mobile communication device 706 is shown, which may be a smartphone, a laptop computing device, a tablet, a digital television or any other suitable type of mobile or portable device configured to receive a signal. The mobile communication device 706 may receive signals over a wireless network 702, a single frequency network 704 or any other suitable type of network. Mobile communication device 706 may comprise a processor 708, a memory 710, a user interface 712 and one or more receivers 106 with Doppler tolerant equalization. Antenna 714 may be coupled to receiver 106. In some embodiments, the user interface may be a touchscreen.

Figure 8:
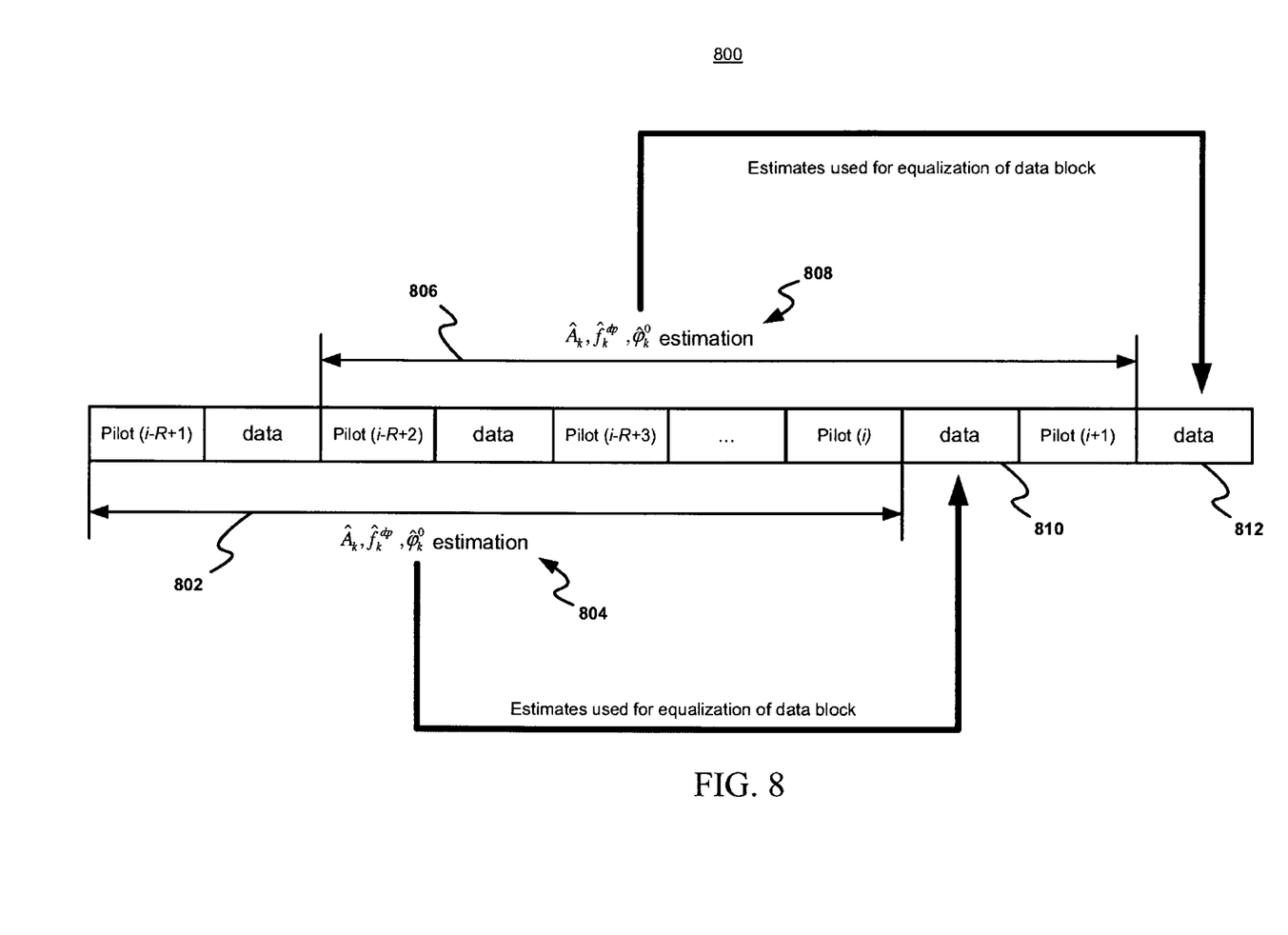
FIG. 8 illustrates a sliding window consistent with one exemplary embodiment of the present disclosure.

FIG. 8 illustrates a sliding window 800 consistent with one exemplary embodiment of the present disclosure. The estimation calculations may be based on segments of the signal that are extracted using a sliding window as described in greater detail above.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. A module, as used in any embodiment herein, may be embodied as circuitry. The circuitry may be embodied as an integrated circuit, such as an integrated circuit chip.

Thus, the present disclosure provides an apparatus, method and system for equalizing a Doppler shifted received signal.

According to one aspect there is provided a mobile communication device. The device may be configured to extract one or more pilot signals from a segment of the received signal. The device of this example may also be configured to perform Minimum Mean Square Error (MMSE) filtering on the extracted pilot signals, and the filtering provides estimated pilot signal impulse responses. The device of this example may further be configured to estimate the amplitudes of one or more path components of the estimated pilot signal impulse responses. The device of this example may further be configured to estimate the phases of one or more path components of the estimated pilot signal impulse responses. The device of this example may be configured to combine the estimated amplitudes and the estimated phases of the path components of the pilot signal impulse responses, and the combination provides an estimated channel impulse response.

Another example device includes the forgoing components and the MMSE filtering provides estimated pilot signal impulse responses, $\hat{h}$, according to:

$$\hat{h}=(X^H X)^{-1} X^H y$$

and y is the extracted pilot signal and X is a matrix of known pilot signal symbols associated with the extracted pilot signal.

Another example device includes the forgoing components and the path amplitude estimation is obtained by averaging the magnitudes of one or more of the estimated pilot signal impulse responses.

Another example device includes the forgoing components and the path phase estimation is obtained by performing a least square linear fit to the phase response of one or more of the estimated pilot signal impulse responses.

Another example device includes the forgoing components and is further configured to provide the segments of the received signal, and the segments overlap by a pre-determined time period.

Another example device includes the forgoing components and is further configured to perform an FFT to transform the channel impulse response to the frequency domain.

Another example device includes the forgoing components and is further configured to perform MMSE equalization to reduce multipath distortion in the received signal.

Another example device includes the forgoing components and the device is a digital ATSC receiver.

Another example device includes the forgoing components and the device is one of a smartphone, a laptop computing device, a tablet, or a digital television.

Another example device includes the forgoing components and the device is configured to communicate over a network, and the network is one of a wireless network, a single frequency network or a digital television network.

According to another aspect there is provided a method. The method may include extracting one or more pilot signals from a segment of the received signal. The method of this example may also include performing MMSE filtering on the extracted pilot signals, and the filtering provides estimated pilot signal impulse responses. The method of this example may further include estimating the amplitudes of one or more path components of the estimated pilot signal impulse responses. The method of this example may further include estimating the phases of one or more path components of the estimated pilot signal impulse responses. The method of this example may further include combining the estimated amplitudes and the estimated phases of the path components of the pilot signal impulse responses, and the combination provides an estimated channel impulse response.

Another example method includes the forgoing operations and the MMSE filtering provides estimated pilot signal impulse responses, $\hat{h}$, according to:

$$\hat{h}=(X^H X)^{-1} X^H y$$

and y is the extracted pilot signal and X is a matrix of known pilot signal symbols associated with the extracted pilot signal.

Another example method includes the forgoing operations and the path amplitude estimation includes averaging the magnitudes of one or more of the estimated pilot signal impulse responses.

Another example method includes the forgoing operations and the path phase estimation includes performing a least square linear fit to the phase response of one or more of the estimated pilot signal impulse responses.

Another example method includes the forgoing operations and further includes providing the segments of the received signal and the segments overlap by a pre-determined time period.

Another example method includes the forgoing operations and further includes performing an FFT to transform the channel impulse response to the frequency domain.

Another example method includes the forgoing operations and further includes performing MMSE equalization on the channel impulse response to reduce multipath distortion in the received signal.

According to another aspect there is provided at least one computer-readable storage medium having instructions stored thereon which when executed by a processor, cause the processor to perform the steps of the method as described in the examples above.

According to another aspect there is provided system. The system may include a processor, a memory coupled to the processor, a user interface coupled to the processor, and an antenna. The system of this example may include a pilot extraction circuit coupled to the antenna and the processor, the pilot extraction circuit configured to extract one or more pilot signals from a segment of the received signal. The system of this example may also include an impulse response estimation filter circuit coupled to the pilot extraction circuit, the impulse response estimation filter circuit configured to perform MMSE filtering on the extracted pilot signals, and the filter provides estimated pilot signal impulse responses. The system of this example may further include a path amplitude estimation circuit coupled to the impulse response estimation filter circuit, the path amplitude estimation filter circuit configured to estimate the amplitudes of one or more path components of the estimated pilot signal impulse responses. The system of this example may further include a path phase estimation circuit coupled to the impulse response estimation filter circuit, the path phase estimation circuit configured to estimate the phases of one or more path components of the estimated pilot signal impulse responses. The system of this example may further include a channel impulse response estimation circuit coupled to the path amplitude estimation circuit and the path phase estimation circuit, the channel impulse response estimation circuit configured to combine the estimated amplitudes and the estimated phases of the path components of the pilot signal impulse responses, and the combination provides an estimated channel impulse response.

Another example system includes the forgoing components and the MMSE filter provides estimated pilot signal impulse responses, $\hat{h}$, according to:

$$\hat{h}=(X^H X)^{-1} X^H y$$

and y is the extracted pilot signal and X is a matrix of known pilot signal symbols associated with the extracted pilot signal.

Another example system includes the forgoing components and the path amplitude estimation is obtained by averaging the magnitudes of one or more of the estimated pilot signal impulse responses.

Another example system includes the forgoing components and the path phase estimation is obtained by performing a least square linear fit to the phase response of one or more of the estimated pilot signal impulse responses.

Another example system includes the forgoing components and the system further includes a block segmentation circuit coupled to the pilot extraction circuit, the block segmentation circuit configured to provide the segments of the received signal and the segments overlap by a pre-determined time period.

Another example system includes the forgoing components and the system further includes an FFT circuit coupled to the channel impulse response estimation circuit, the FFT circuit configured to transform the channel impulse response to the frequency domain.

Another example system includes the forgoing components and the system further includes an MMSE equalizer circuit coupled to the channel impulse response estimation circuit, the MMSE equalizer circuit configured to reduce multipath distortion in the received signal.

Another example system includes the forgoing components and the system is one of a smartphone, a laptop computing device, a tablet, or a digital television.

Another example system includes the forgoing components and the user interface is a touchscreen.

Another example device includes the forgoing components and the device is configured to communicate over a network, and the network is one of a wireless network, a single frequency network or a digital television network.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A mobile communication device configured to:
   extract one or more pilot signals from a segment of a received signal;
   perform Minimum Mean Square Error (MMSE) filtering on said extracted pilot signals, wherein said MMSE filtering provides estimated pilot signal impulse responses, $\hat{h}$, according to:

$$\hat{h}=(X^H X)^{-1} X^H y$$

wherein y is said extracted pilot signal and X is a matrix of known pilot signal symbols associated with said extracted pilot signal;
   estimate the amplitudes of one or more path components of said estimated pilot signal impulse responses;
   estimate the phases of one or more path components of said estimated pilot signal impulse responses; and
   combine said estimated amplitudes and said estimated phases of said path components of said pilot signal impulse responses, wherein said combination provides an estimated channel impulse response.

2. The mobile communication device of claim 1, wherein said path amplitude estimation is obtained by averaging the magnitudes of one or more of said estimated pilot signal impulse responses.

3. The mobile communication device of claim 1, wherein said path phase estimation is obtained by performing a least square linear fit to the phase response of one or more of said estimated pilot signal impulse responses.

4. The mobile communication device of claim 1, further configured to provide said segments of said received signal wherein said segments overlap by a pre-determined time period.

5. The mobile communication device of claim 1, further configured to perform a Fast Fourier Transform (FFT) to transform said channel impulse response to the frequency domain.

6. The mobile communication device of claim 1, further configured to perform MMSE equalization to reduce multipath distortion in said received signal.

7. The mobile communication device of claim 1, wherein said device is a digital Advanced Television System Committee (ATSC) receiver.

8. The mobile communication device of claim 1, wherein said device is selected from the group consisting of a smartphone, a laptop computing device, a tablet, and a digital television.

9. The mobile communication device of claim 1, wherein said device is configured to communicate over a network, and wherein said network is selected from the group consisting of a wireless network, a single frequency network or a digital television network.

10. A method to equalize a Doppler shifted received signal, said method comprising:
    extracting one or more pilot signals from a segment of said received signal;
    performing MMSE filtering on said extracted pilot signals, wherein said MMSE filtering provides estimated pilot signal impulse responses, $\hat{h}$, according to:

$\hat{h}=(X^H X)^{-1} X^H y$ wherein y is said extracted pilot signal and X is a matrix of known pilot signal symbols associated with said extracted pilot signal;

estimating the amplitudes of one or more path components of said estimated pilot signal impulse responses;

estimating the phases of one or more path components of said estimated pilot signal impulse responses; and combining said estimated amplitudes and said estimated phases of said path components of said pilot signal impulse responses, wherein said combination provides an estimated channel impulse response.

11. The method of claim 10, wherein said path amplitude estimation comprises averaging the magnitudes of one or more of said estimated pilot signal impulse responses.

12. The method of claim 10, wherein said path phase estimation comprises performing a least square linear fit to the phase response of one or more of said estimated pilot signal impulse responses.

13. The method of claim 10, further comprising providing said segments of said received signal wherein said segments overlap by a pre-determined time period.

14. The method of claim 10, further comprising performing an FFT to transform said channel impulse response to the frequency domain.

15. The method of claim 10, further comprising performing MMSE equalization on said channel impulse response to reduce multipath distortion in said received signal.

16. A non-transitory computer-readable storage medium having instructions stored thereon which when executed by a processor result in the following operations for estimating receiver noise variance, said operations comprising:

extracting one or more pilot signals from a segment of said received signal;

performing MMSE filtering on said extracted pilot signals, wherein said MMSE filtering provides estimated pilot signal impulse responses, $\hat{h}$, according to:

$\hat{h}=(X^H X)^{-1} X^H y$ wherein y is said extracted pilot signal and X is a matrix of known pilot signal symbols associated with said extracted pilot signal;

estimating the amplitudes of one or more path components of said estimated pilot signal impulse responses;

estimating the phases of one or more path components of said estimated pilot signal impulse responses; and combining said estimated amplitudes and said estimated phases of said path components of said pilot signal impulse responses, wherein said combination provides an estimated channel impulse response.

17. The non-transitory computer-readable storage medium of claim 16, wherein said path amplitude estimation comprises averaging the magnitudes of one or more of said estimated pilot signal impulse responses.

18. The non-transitory computer-readable storage medium of claim 16, wherein said path phase estimation comprises performing a least square linear fit to the phase response of one or more of said estimated pilot signal impulse responses.

19. The non-transitory computer-readable storage medium of claim 16, wherein said operations further comprise providing said segments of said received signal wherein said segments overlap by a pre-determined time period.

20. The non-transitory computer-readable storage medium of claim 16, wherein said operations further comprise performing an FFT to transform said channel impulse response to the frequency domain.

21. The non-transitory computer-readable storage medium of claim 16, wherein said operations further comprise performing MMSE equalization on said channel impulse response to reduce multipath distortion in said received signal.

22. A system to equalize a Doppler shifted received signal, said system comprising:

a processor;

a memory coupled to said processor;

a user interface coupled to said processor;

an antenna;

a pilot extraction circuit coupled to said antenna and to said processor, said pilot extraction circuit configured to extract one or more pilot signals from a segment of said received signal;

an impulse response estimation filter circuit coupled to said pilot extraction circuit, said impulse response estimation filter circuit configured to perform MMSE filtering on said extracted pilot signals, wherein said MMSE filtering provides estimated pilot signal impulse responses, $\hat{h}$, according to:

$\hat{h}=(X^H X)^{-1} X^H y$ wherein y is said extracted pilot signal and X is a matrix of known pilot signal symbols associated with said extracted pilot signal;

a path amplitude estimation circuit coupled to said impulse response estimation filter circuit, said path amplitude estimation circuit configured to estimate the amplitudes of one or more path components of said estimated pilot signal impulse responses;

a path phase estimation circuit coupled to said impulse response estimation filter circuit, said path phase estimation circuit configured to estimate the phases of one or more path components of said estimated pilot signal impulse responses; and a channel impulse response estimation circuit coupled to said path amplitude estimation circuit and said path phase estimation circuit, said channel impulse response estimation circuit configured to combine said estimated amplitudes and said estimated phases of said path components of said pilot signal impulse responses, wherein said combination provides an estimated channel impulse response.

23. The system of claim 22, wherein said path amplitude estimation is obtained by averaging the magnitudes of one or more of said estimated pilot signal impulse responses.

24. The system of claim 22, wherein said path phase estimation is obtained by performing a least square linear fit to the phase response of one or more of said estimated pilot signal impulse responses.

25. The system of claim 22, further comprising a block segmentation circuit coupled to said pilot extraction circuit, said block segmentation circuit configured to provide said segments of said received signal wherein said segments overlap by a pre-determined time period.

26. The system of claim 22, further comprising an FFT circuit coupled to said channel impulse response estimation circuit, said FFT circuit configured to transform said channel impulse response to the frequency domain.

* * * * *